United States Patent
Leung et al.

(10) Patent No.: US 8,363,014 B2
(45) Date of Patent: Jan. 29, 2013

(54) WIRELESS KEYBOARD BASE AND PORTABLE ELECTRONIC DEVICE

(75) Inventors: Chee-Chun Leung, Tao Yuan Shien (TW); Yuan-Chen Liang, Tao Yuan Shien (TW); Gwo-Chyuan Chen, Taipei (TW); Shyh-Wei Lee, Taipei County (TW)

(73) Assignee: Quanta Computer Inc., Taoyuan Shien (TW)

( * ) Notice: Subject to any disclaimer, the term of this patent is extended or adjusted under 35 U.S.C. 154(b) by 999 days.

(21) Appl. No.: 12/382,037

(22) Filed: Mar. 6, 2009

(65) Prior Publication Data

US 2010/0123663 A1 May 20, 2010

(30) Foreign Application Priority Data

Nov. 14, 2008 (TW) .............................. 97220501 U

(51) Int. Cl.
*G06F 3/02* (2006.01)

(52) U.S. Cl. ...... 345/169; 345/168; 341/21; 361/679.09
(58) Field of Classification Search .................. 345/173, 345/156–158, 168–169; 341/21–23; 361/681–683, 361/679.09
See application file for complete search history.

(56) References Cited

U.S. PATENT DOCUMENTS

| 6,510,048 | B2 * | 1/2003 | Rubenson et al. ........ 361/679.09 |
| 6,687,518 | B1 * | 2/2004 | Park ............................ 455/575.1 |
| 6,870,732 | B2 * | 3/2005 | Huang et al. ............. 361/679.17 |
| 2003/0021082 | A1 * | 1/2003 | Lu et al. ........................ 361/683 |
| 2011/0170252 | A1 * | 7/2011 | Jones et al. ............. 361/679.09 |

* cited by examiner

*Primary Examiner* — Kimnhung Nguyen
(74) *Attorney, Agent, or Firm* — Rabin & Berdo, P.C.

(57) ABSTRACT

A wireless keyboard base includes a base, a wireless keyboard and a plurality of magnets. The base has a groove to accommodate an edge of an electronic device. The wireless keyboard is disposed on the base and has a wireless communication module to exchange information data with the electronic device. The plurality of magnets are disposed within the groove to magnetically attract the edge of the electronic device.

18 Claims, 5 Drawing Sheets

WIRELESS KEYBOARD BASE AND PORTABLE ELECTRONIC DEVICE

RELATED APPLICATIONS

This application claims priority to Taiwan Application Serial Number 97220501, filed Nov. 14, 2008, which are herein incorporated by reference.

BACKGROUND

1. Field of Invention

The present invention relates to a computer input device. More particularly, the present invention relates to a keyboard, which is capable of wireless communicating with a matched electronic device.

2. Description of Related Art

Several Apple electronic devices, e.g. I-Phone or I-Pod, in the market have a touch-control display screen as their only input devices. These electronic devices are often equipped with a larger-size screen (compared with a conventional mobile phone), but not equipped with a keyboard as an input device. However, the keyboard is an input interface that most users got used to since the computer is invented. How to permit a user to use a keyboard to input data into these electronic devices, e.g. I-Phone or I-Pod, with touch-control display screen as their only input devices.

SUMMARY

It is therefore an objective of the present invention to provide a wireless keyboard base and a portable electronic device.

In accordance with the foregoing and other objectives of the present invention, a wireless keyboard base includes a base, a wireless keyboard and a plurality of magnets. The base has a groove to accommodate an edge of an electronic device. The wireless keyboard is disposed on the base and has a wireless communication module to exchange information data with the electronic device. The plurality of magnets are disposed within the groove to magnetically attract the edge of the electronic device.

In accordance with the foregoing and other objectives of the present invention, a portable device includes an electronic device, a wireless keyboard base, a wireless keyboard and a plurality of magnets. The electronic device has a magnetically attractable edge. The wireless keyboard base has a groove to accommodate the edge of the electronic device. The wireless keyboard has a wireless communication module to exchange information data with the electronic device. The plurality of magnets are disposed within the groove to magnetically attract the edge of the electronic device.

Thus, the present invention provides a wireless keyboard base for an electronic device with a touch-control screen as its only single input device, e.g. I-Pod or I-Phone, such that the electronic device can be equipped with an optional input device without modifying original appearance of the electronic device.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
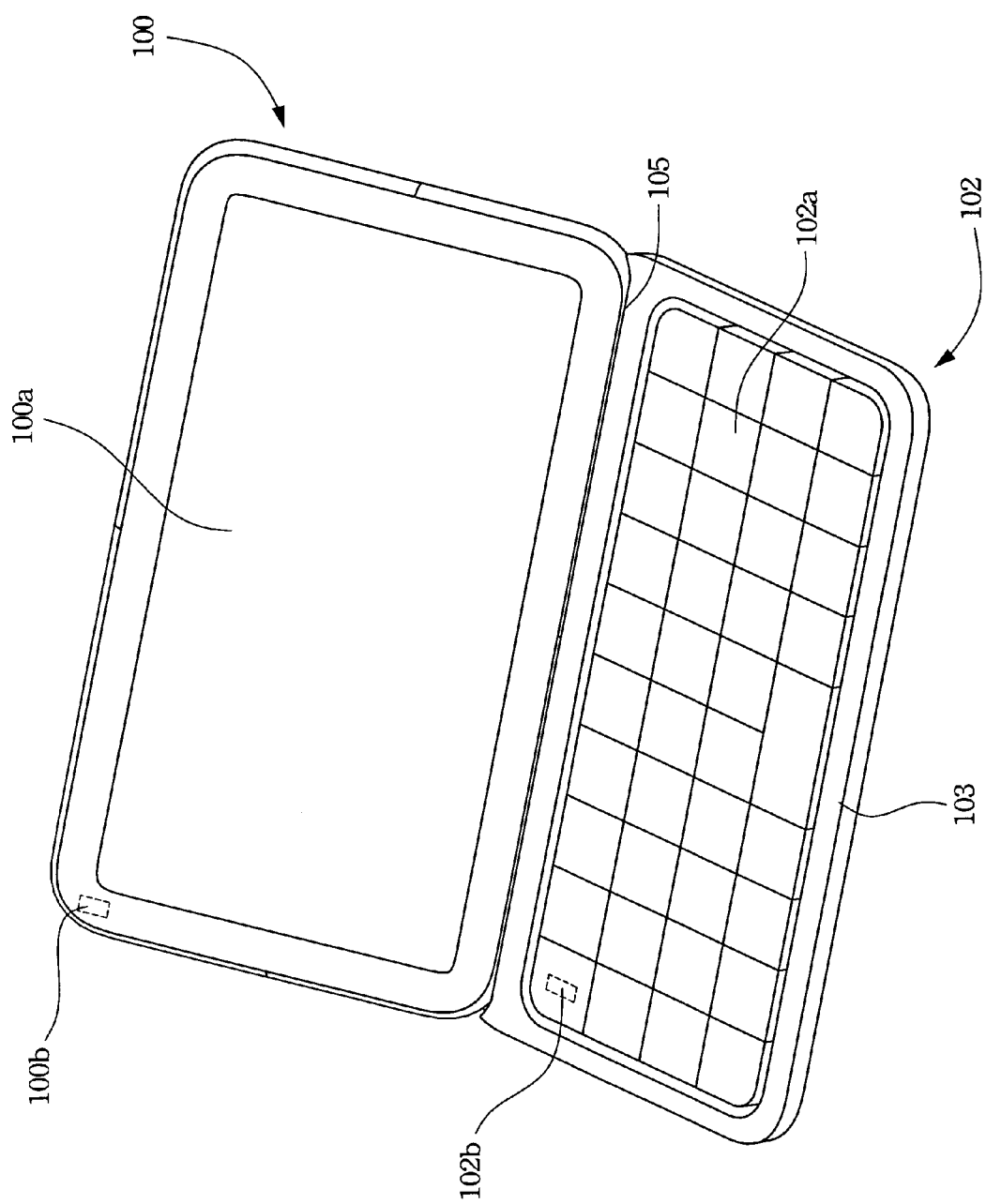
FIG. 1 illustrates a perspective view of an electronic device and its matched keyboard base according to one embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a perspective view of an electronic device and its matched wireless keyboard base according to one embodiment of this invention. The electronic device 100 includes a display screen 100a and a wireless communication module 100b. The wireless keyboard base 102 has a base 103, a wireless keyboard 102a and a plurality of magnets 107 (referring to FIG. 2). The wireless keyboard 102a has a wireless communication module 102b. In this embodiment, the electronic device 100 is inserted into a groove 105 arranged along an edge of the wireless keyboard base 102. The display screen 100a can be a touch-control screen, e.g. a capacitive or resistive touch-control display screen, for a user to input data and display data. When the electronic device 100 is coupled with the wireless keyboard base 102 (as illustrated in FIG. 1), the user can use the wireless keyboard 102a to input data quickly and watch data displayed by the display screen 100a. The electronic device 100 can be adjusted its position, i.e. a slanted position relative to the wireless keyboard base 102. The wireless keyboard 102a can be a QWERTY keyboard. In this embodiment, the wireless keyboard 102a exchanges information with the electronic device 100 via a wireless communication interface, the wireless communication module 102b of the wireless keyboard 102a and the wireless communication module 100b of the electronic device 100 should be of the same wireless communication interface. The wireless communication interface can be an infrared communication interface, a blue tooth communication interface or a WIFI communication interface.

Figure 2:
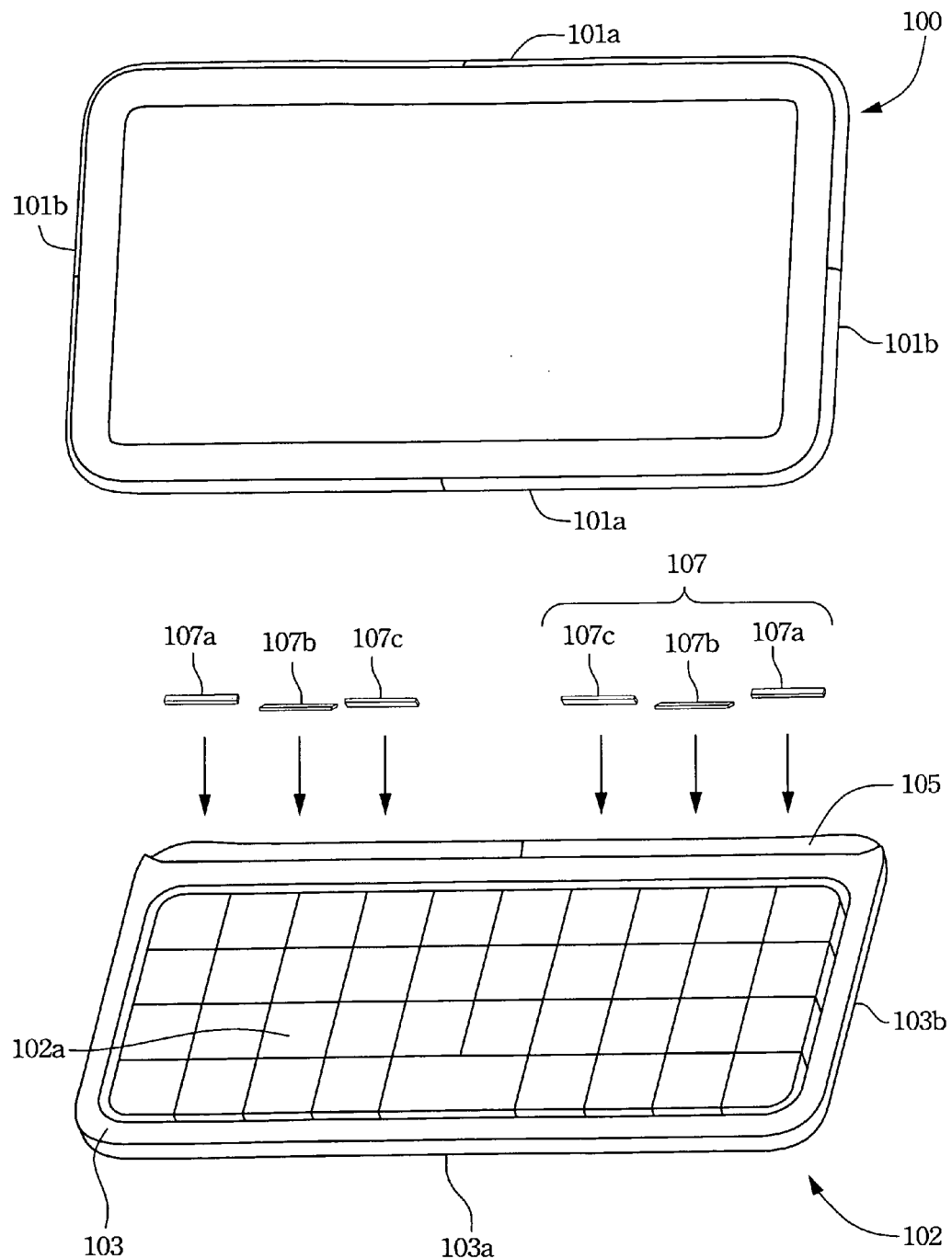
FIG. 2 illustrates an exploded view of the electronic device as illustrated in FIG. 1.

FIG. 2 illustrates an exploded view of the electronic device as illustrated in FIG. 1. The wireless keyboard base 102 and the electronic device 100 are both of a generally rectangular shape with a relatively long edge and a relatively short edge. In this embodiment, the electronic device 100 has its relatively long edge 110a inserted within the groove 105 along a relatively long edge 103a of the wireless keyboard base 102 such that the display screen 100a of the electronic device 100 is in landscape view. The groove 105 is a long-strip groove arranged along the relatively long edge 103a of the wireless keyboard base 102. In another embodiment (not illustrated in drawings), the electronic device 100 may have its relatively short edge 101b inserted within a groove along a relatively short edge 103b of the wireless keyboard base 102 such that the display screen 100a of the electronic device 100 is in portrait view. In order to ensure the electronic device 100 to be firmly secured within the groove 105 of the wireless keyboard base 102, magnet sets 107 are installed within the groove 105. In this embodiment, the groove 105 has two magnet sets 107, and each magnet set 107 has three magnets respectively located where indicated by three arrows in the drawings. Moreover, the electronic device 100 should have its relatively long edge 101a made from magnetically attractable materials, such as iron, cobalt, nickel, oxide thereof or alloy thereof, which can be magnetically attracted by the magnet sets 107.

Figure 3:
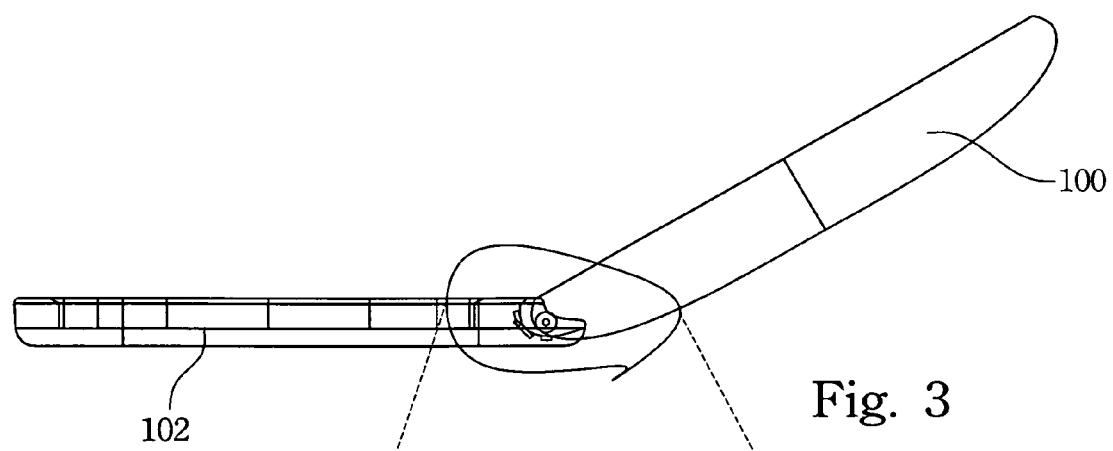
FIG. 3 illustrates a cross-sectional view of the electronic device as illustrated in FIG. 1.
Figure 4:
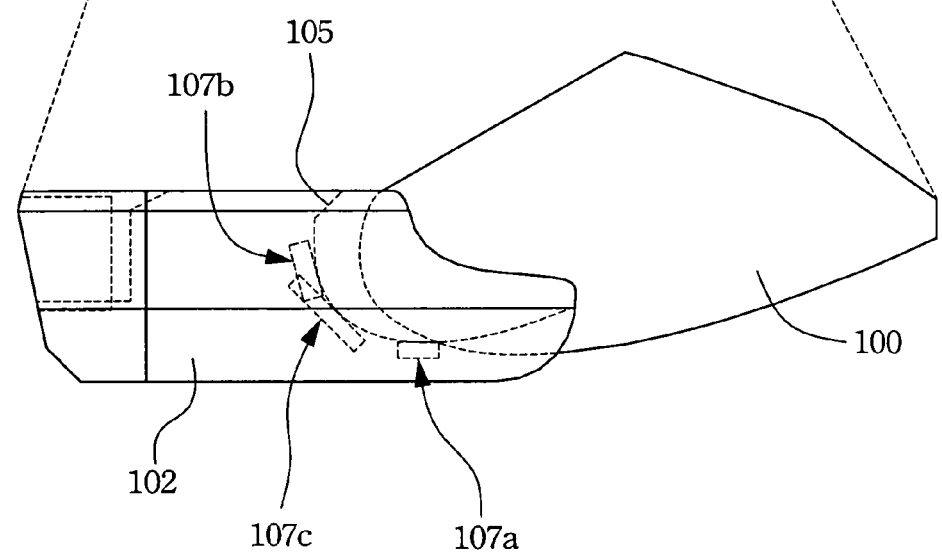
FIG. 4 illustrates an enlarged cross-sectional view of the hinge as illustrated in FIG. 3.

FIG. 3 illustrates a cross-sectional view of the electronic device as illustrated in FIG. 1. FIG. 4 illustrates an enlarged cross-sectional view of the hinge as illustrated in FIG. 3. From a cross-sectional view, three magnets (107a, 107b, 107c) of each magnet set 107 are located at different positions within the groove 105 so as to ensure the electronic device 100 to be firmly secured within the groove 105 at different slanted positions. As the electronic device 100 rotates among different slanted positions (relative to the wireless keyboard base 102), its center of gravity moves as well. The magnets (107a, 107b, 107c) located at different positions within the groove are used to ensure the electronic device 100 to be firmly secured within thereof.

Figure 5:
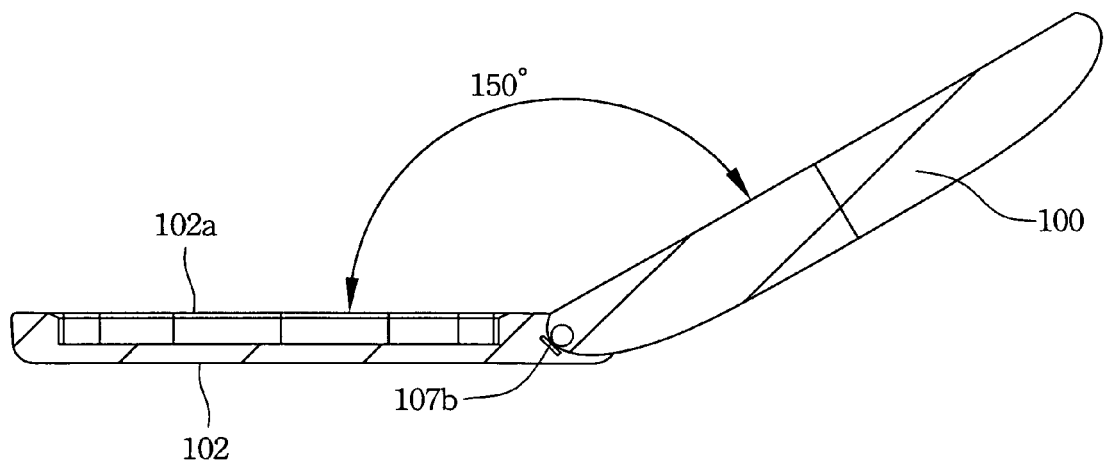
FIGS. 5-7 respectively illustrate three different cross-sectional views of three connection statuses of the electronic device

Referring to FIG. 5, when an include angle between the electronic device 100 and the wireless keyboard base 102 is 150 degrees, the magnet 107b provides a most reliable magnetic force (compared with the other two magnets) to retain the edge of the electronic device 100 within the groove 105.

Figure 6:
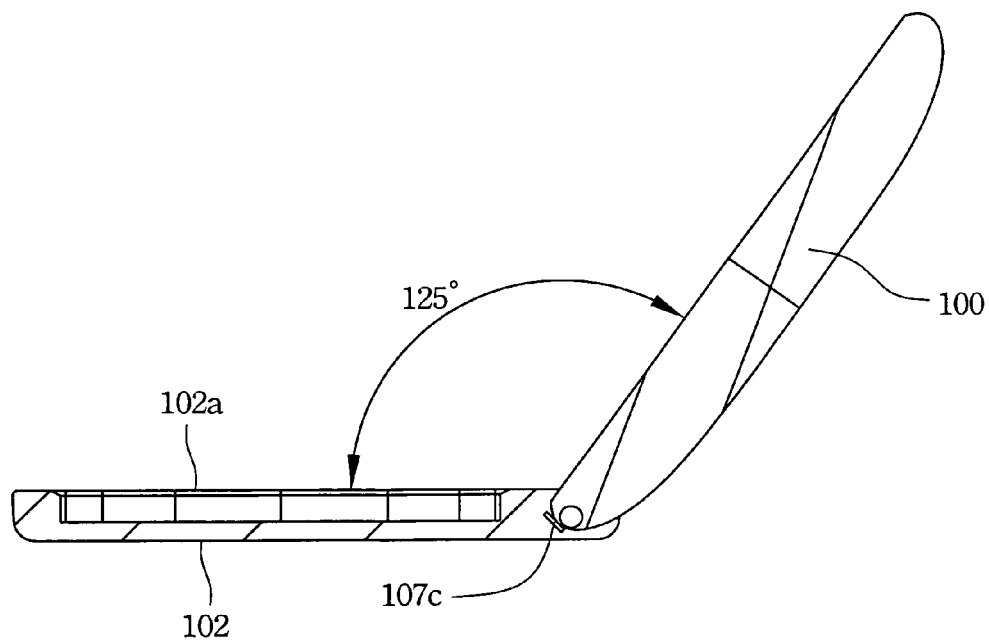

Referring to FIG. 6, when an include angle between the electronic device 100 and the wireless keyboard base 102 is 125 degrees, the magnet 107c provides a most reliable magnetic force (compared with the other two magnets) to retain the edge of the electronic device 100 within the groove 105.

Figure 7:
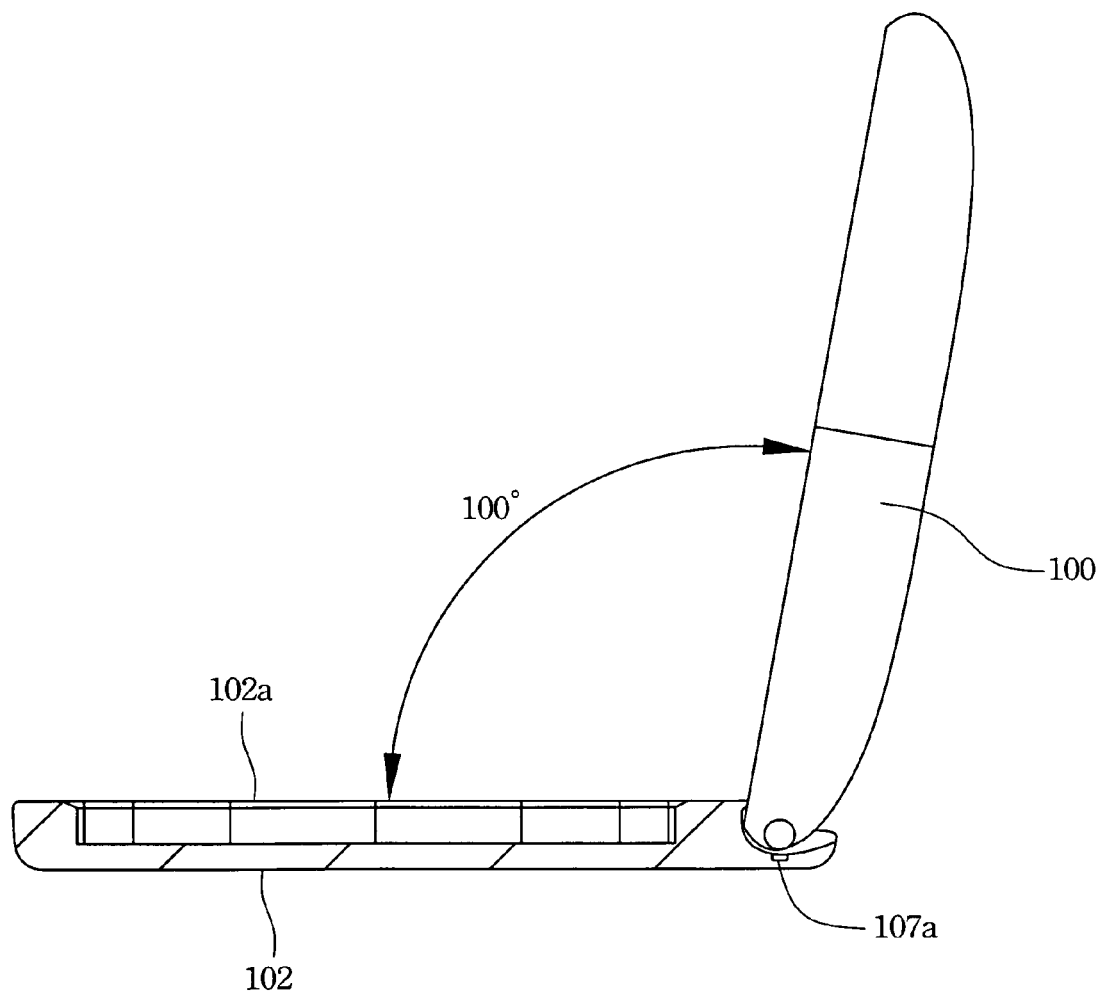

Referring to FIG. 7, when an include angle between the electronic device 100 and the wireless keyboard base 102 is 100 degrees, the magnet 107a provides a most reliable magnetic force (compared with the other two magnets) to retain the edge of the electronic device 100 within the groove 105.

In order to permit the electronic device 100 to be rotatable at least 50 degrees relative to the wireless keyboard base 102, the inner wall of the groove 105 should be well matched with the outer wall of the electronic device's relatively long edge 101a to achieve such rotation range. The inner wall of the groove 105 as illustrated in FIG. 5, FIG. 6 and FIG. 7 is exemplary, not the only embodiment to achieve such rotation range.

Although the embodiments discussed herein only illustrate two magnet sets (each magnet set has three magnets) to secure the edge of the electronic device 100 within the groove 105, any person skilled in the art may adjust quantities of the magnet sets according to actual demands.

According to discussed embodiments, the present invention provides a wireless keyboard base for an electronic device with a touch-control screen as its only single input device, e.g. I-pod or I-phone, such that the electronic device can be equipped with an optional input device without modifying original appearance of the electronic device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless keyboard base, comprising:
   a base having an edge groove to accommodate an edge of an electronic device having a touch-control display screen as a single input device thereof;
   a wireless keyboard disposed on the base and having a wireless communication module to exchange information data with the electronic device; and
   a plurality of magnets disposed within the edge groove to magnetically attract the edge of the electronic device.

2. The wireless keyboard base of claim 1, wherein the base is of a generally rectangular shape having a relatively long edge and a relatively short edge.

3. The wireless keyboard base of claim 2, wherein the edge groove is disposed along the relatively long edge of the base.

4. The wireless keyboard base of claim 1, wherein the wireless keyboard is a QWERTY keyboard.

5. The wireless keyboard base of claim 1, wherein the magnets are disposed at different positions from a cross-sectional view.

6. A portable device, comprising:
   an electronic device having a magnetically attractable edge and a touch-control display screen as a single input device thereof; and
   a wireless keyboard base having an edge groove to accommodate the edge of the electronic device, wherein the wireless keyboard base comprising:
   a wireless keyboard disposed on the wireless keyboard base and having a wireless communication module to exchange information data with the electronic device; and
   a plurality of magnets disposed within the edge groove to attract the magnetically attractable edge.

7. The portable device of claim 6, wherein the touch-control display screen is a capacitive touch-control display screen.

8. The portable device of claim 6, wherein the touch-control display screen is a resistive touch-control display screen.

9. The portable device of claim 6, wherein the base is of a generally rectangular shape having a relatively long edge and a relatively short edge.

10. The portable device of claim 9, wherein the edge groove is disposed along the relatively long edge of the base.

11. The portable device of claim 6, wherein the electronic device is of a generally rectangular shape having a relatively long edge and a relatively short edge.

12. The portable device of claim 11, wherein the magnetically attractable edge is the relatively long edge of the electronic device.

13. The portable device of claim 6, wherein the wireless keyboard is a QWERTY keyboard.

14. The portable device of claim 6, herein the magnets are disposed at different positions from a cross-sectional view.

15. The portable device of claim 6, wherein the edge groove comprises an inner wall well matched with an outer wall of the magnetically attractable edge to provide the electronic device a rotation range of at least 50 degrees relative the wireless keyboard base.

16. The portable device of claim 6, wherein the magnetically attractable edge comprises iron, cobalt, nickel, oxide thereof or alloy thereof.

17. The portable device of claim 16, wherein the wireless interface comprises an infrared communication interface, a blue tooth communication interface or a WIFI communication interface.

18. The portable device of claim 6, wherein the electronic device comprises another wireless communication module, which exchanges information data with the wireless communication module of the wireless keyboard via a wireless interface.

* * * * *